J. P. METZGER.
COUPLING.
APPLICATION FILED JULY 27, 1915.

1,186,325.  
Patented June 6, 1916.

WITNESSES  
Edw. Thorpe  
Hedy. Hoster

INVENTOR  
Jules P. Metzger  
BY  
ATTORNEYS

UNITED STATES PATENT OFFICE.

JULES P. METZGER, OF CARLSTADT, NEW JERSEY, ASSIGNOR TO THE LESLIE COMPANY, OF LYNDHURST, NEW JERSEY, A CORPORATION OF NEW JERSEY.

COUPLING.

1,186,325.      Specification of Letters Patent.      Patented June 6, 1916.

Application filed July 27, 1915. Serial No. 42,159.

*To all whom it may concern:*

Be it known that I, JULES P. METZGER, a citizen of the United States, and a resident of Carlstadt, in the county of Bergen and State of New Jersey, have invented a new and Improved Coupling, of which the following is a full, clear, and exact description.

The invention relates to couplings, such as are used on locomotive injectors, and which have a sectional coupling ring.

The object of the invention is to provide a new and improved coupling arranged to permit of quickly and conveniently coupling or uncoupling the parts without disturbing the position thereof.

In order to produce the desired result, use is made of a sectional coupling ring adapted to abut against a shoulder on one of the members to be coupled together, and means engaging said ring to draw the members into coupling engagement, the said means being adapted to pass the said shoulder.

A practical embodiment of the invention is represented in the accompanying drawings forming a part of this specification, in which similar characters of reference indicate corresponding parts in all the views.

Figure 1:
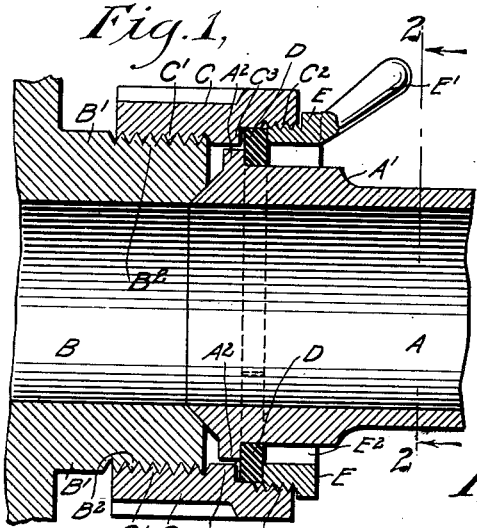
Figure 2:
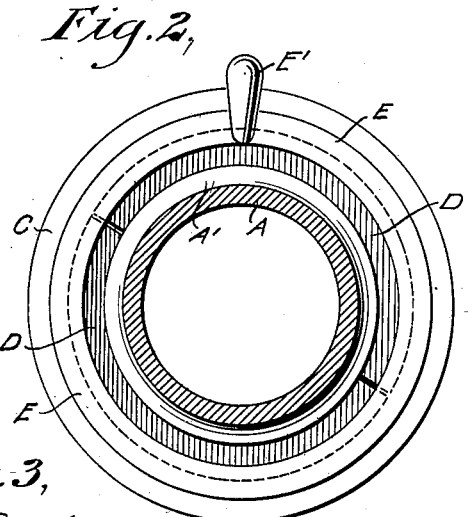
Figure 3:
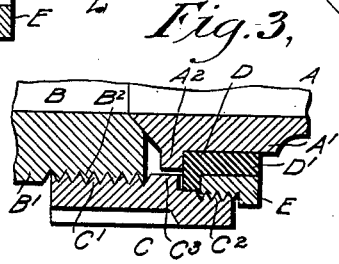
Figure 4:
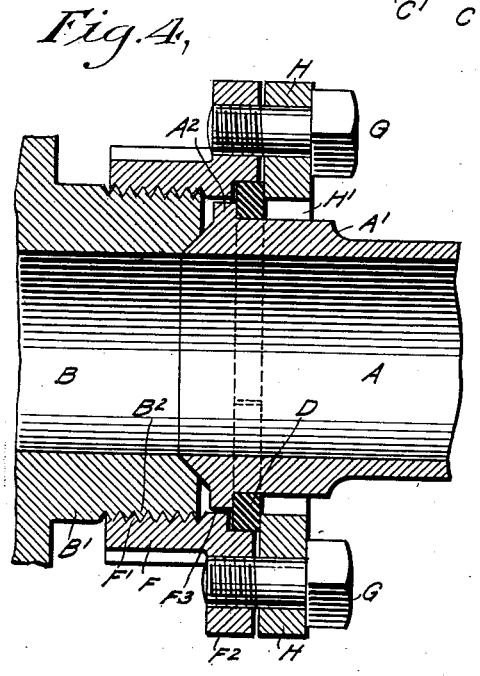

Figure 1 is a longitudinal central section of a coupling as applied to connect a steam pipe to the injector; Fig. 2 is a transverse section of the same on the line 2—2 of Fig. 1; Fig. 3 is a longitudinal central section of a portion of a modified form of the coupling; Fig. 4 is a longitudinal central section of another modified form of the coupling; and Fig. 5 is a similar view of another modified form of the coupling.

The coupling illustrated in Figs. 1 and 2 is shown applied to a locomotive injector for coupling a steam pipe A to the nipple B' of the injector B, the said nipple B' having an exterior screw thread $B^2$ with which coöperates the interior screw thread C' on the coupling nut C. The coupling nut C is provided at its front end with an interior screw thread $C^2$ separated from the rear screw thread C' by an annular seat $C^3$. The coupling member A has an enlarged coupling head A' provided with a shoulder $A^2$ adapted to be passed by the seat $C^3$ of the coupling nut C. The shoulder $A^2$ abuts against a ring D, made in two, three or more sections, and this sectional ring D is pressed on by a tubular plug E screwing on the screw thread $C^2$ of the coupling nut C. The plug E may be turned by a spanner wrench but is preferably provided with a handle E' to permit the engineer to conveniently screw up the plug E or unscrew the same by hand. The opening $E^2$ in the plug E is sufficiently large to pass the shoulder $A^2$ to permit of assembling the parts or disassembling the same without disturbing the position of the steam pipe A and the injector B, as the plug E can pass the shoulder $A^2$. It is understood that when the plug E is unscrewed and passed back onto the steam pipe A then the coupling nut C can be unscrewed and likewise passed onto the steam pipe A together with the sectional ring D, the sections of which can be readily taken apart after leaving the enlarged head A'. In a like manner the steam pipe A and the injector B can be coupled together by first screwing up the coupling nut C, then placing the sectional ring D in position and finally screwing up the plug E. If desired, the sectional ring D may be provided with a hub extension D' filling the opening $E^2$ in the plug E, as plainly indicated in Fig. 3, but otherwise this construction is the same as above described in reference to Figs. 1 and 2.

In the modified form shown in Fig. 4, a coupling nut F is provided having an interior screw thread F' screwing onto the thread $B^2$ of the nipple B', and the said coupling nut F is provided with a flange $F^2$ and with a seat $F^3$, similar to the seat $C^3$ shown and described in the description of the construction disclosed in Figs. 1, 2 and 3. The sectional ring D fits onto the head A' of the steam pipe A and abuts against the annular shoulder $A^2$, and this sectional ring D is engaged at its outer face by a flange H fastened by bolts G to the flange $F^2$. Thus, on screwing up the bolts G, the flange H exerts a pressure against the sectional ring D and the latter exerts a like pressure on the annular shoulder $A^2$ to draw the steam pipe A in firm coupling engagement with the nipple B', the same as above described when screwing up the plug E. It is understood that the opening H' in the flange H is sufficiently large to pass the shoulder $A^2$, for the same reason as above described relative to the opening $E^2$ in the plug E.

Figure 5:
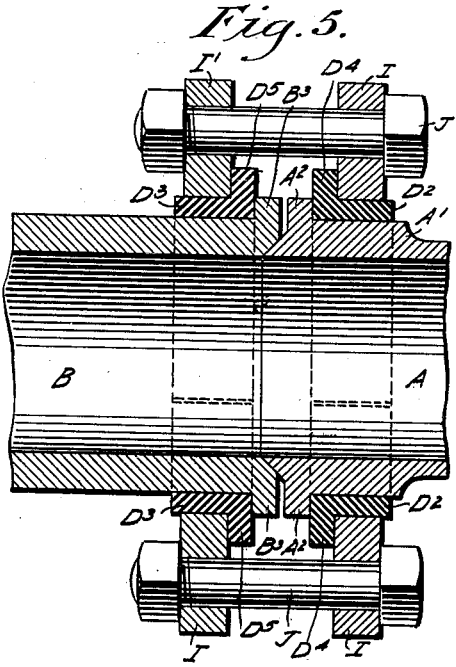

In the modified form shown in Fig. 5, the steam pipe A is provided with an enlarged head A' having an annular shoulder A² against which abuts a sectional ring D², and the injector B is provided with an annular shoulder B³ against which abuts a sectional ring D³. The sectional rings D², D³ are provided with annular flanges D⁴, D⁵, against which abut coupling flanges I, I' connected with each other by bolts J to permit of drawing the steam pipe A into coupling engagement with the injector B. The openings in the coupling flanges I, I' are sufficiently large to pass the shoulders A² and B³, respectively, for the same reason as above described in reference to the openings H', H² in the flange H and the plug E, so that further description of this feature of the invention is not deemed necessary.

From the foregoing, it will be seen that by the arrangement described, the coupling is used for properly coupling the two parts together, and the parts can be readily uncoupled at any time without disturbing the position of the coupled parts. Thus for locomotive service and equipment the coupling is exceedingly serviceable especially when used on injectors having steam pressures up to and above 200 lbs.

It will be noticed that the coupling shown and described is very simple and durable in construction, and composed of few parts to permit the engineer to readily uncouple the steam pipe A from the injector B for emergency repairs or other purposes.

Having thus described my invention, I claim as new and desire to secure by Letters Patent:

1. In a coupling, the combination with members to be coupled together one having a movable coupling ring thereon and the other one having an annular shoulder, a sectional ring adapted to abut against the shoulder, and drawing up means engaging the said coupling ring and sectional ring, and having an opening adapted to pass the said shoulder.

2. In a coupling, the combination with members to be coupled and of which one is provided with an exterior screw thread and the other with an annular shoulder, a coupling nut screwing on the said screw thread, a sectional ring abutting against the said shoulder, and means movable toward the coupling nut and engaging the said ring, the said means having an opening adapted to pass the said shoulder.

3. In a coupling, the combination with members to be coupled and of which one is provided with an exterior screw thread and the other with an annular shoulder, a coupling nut screwing on the said screw thread, a sectional ring abutting against the said shoulder, and a tubular plug screwing in the said nut and engaging the said sectional ring, the plug having an opening for the passage of the said shoulder.

4. In a coupling, the combination with members to be coupled and of which one is provided with an exterior screw thread and the other with an annular shoulder, a coupling nut screwing on the said thread and having an annular seat, a sectional ring abutting against the said shoulder and seated in the said seat, and means engaging the said sectional ring and the said coupling nut to draw the said sectional ring against the said shoulder, the said means being provided with an opening adapted to pass the said shoulder.

5. In a coupling, the combination with members to be coupled and of which one is provided with an exterior screw thread and the other with an annular shoulder, a coupling nut screwing on the said thread and having an annular seat, a sectional ring abutting against the said shoulder and seated in the said seat, and a handled tubular plug screwing in the outer end of the said coupling nut against the said sectional ring, the opening in the plug being adapted to pass the said shoulder.

6. In a coupling, the combination with members to be coupled and of which one is provided with an exterior screw thread and the other with an annular shoulder, a coupling nut having separate front and rear threads at the ends and an annular seat intermediate the said threads, the said rear thread screwing on the exterior thread of the said member, a sectional ring abutting against the said shoulder, and a tubular plug screwing on the said front thread and abutting against the said sectional ring, the opening in the said plug being adapted to pass the said shoulder.

In testimony whereof I have signed my name to this specification in the presence of two subscribing witnesses.

JULES P. METZGER.

Witnesses:
THEO. G. HOSTER,
PHILIP D. ROLLHAUS.